United States Patent
Iga

(10) Patent No.: US 6,302,252 B1
(45) Date of Patent: Oct. 16, 2001

(54) ONE-WAY CLUTCH INTEGRATED WITH A ROLLING BEARING

(75) Inventor: Kazuo Iga, Yamatotakada (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 0 days.

(21) Appl. No.: 09/547,658

(22) Filed: Apr. 12, 2000

(30) Foreign Application Priority Data

Apr. 16, 1999 (JP) .................................................. 11-110102

(51) Int. Cl.$^7$ ...................................................... F16D 41/07
(52) U.S. Cl. ........................................ 192/45.1; 192/41 A
(58) Field of Search ................................ 192/41 A, 41 R, 192/45.1; 403/326, 366

(56) References Cited

U.S. PATENT DOCUMENTS

| | | | |
|---|---|---|---|
| 3,006,447 | * 10/1961 | Irwin ..................... | 192/45.1 |
| 5,664,653 | * 9/1997 | Kurita et al. ............ | 192/45.1 |
| 5,819,899 | * 10/1998 | Iga et al. ................ | 192/45.1 |
| 6,119,838 | * 9/2000 | Igari et al. .............. | 192/45.1 |

FOREIGN PATENT DOCUMENTS 9-166161   6/1997   (JP) .

* cited by examiner

Primary Examiner—Rodney H. Bonck
Assistant Examiner—Saúl Rodriguez
(74) Attorney, Agent, or Firm—Jordan and Hamburg LLP

(57) ABSTRACT

In a one-way clutch integrated with a rolling bearing which has a structure of integrating two annular members with each other by snap fit, and which comprises a cage that holds rolling elements of the rolling bearing, and sprags of the one-way clutch, the two annular members are prevented by a simple configuration from being separated from each other by a function of an impact load or the like.

As means for realizing the above, a rib which elongates in the axial direction is formed in each of claws formed in a first annular member, and recesses formed in a second annular member, the ribs being adjacent to each other in a radial direction in an engagement state of the members. Bending of the claw in an inner radial direction is blocked by interference between the ribs, whereby the flexural strength of the claw is substantially improved.

3 Claims, 6 Drawing Sheets

The direction of insertion into the recess 54

The direction of insertion of the claw 53

ONE-WAY CLUTCH INTEGRATED WITH A ROLLING BEARING

BACKGROUND OF THE INVENTION

The invention relates to a one-way clutch integrated with a rolling bearing which is configured by integrating a sprag one-way clutch with a rolling bearing.

Usually, a one-way clutch integrated with a rolling bearing which is configured by integrating a sprag one-way clutch with a rolling bearing has a configuration in which a raceway surface for a rolling bearing, and that for a one-way clutch are respectively formed on the inner and outer races, plural rolling elements make rolling contact with the raceway surface for a rolling bearing, and plural sprags tiltably make contact with the raceway surface for a one-way clutch.

As such a one-way clutch integrated with a rolling bearing, a clutch of the type in which a raceway surface for a one-way clutch is formed in both the sides of a raceway surface for a rolling bearing has been practically used. In a clutch of this type, as a common cage which holds rolling elements and sprags at constant intervals in the circumferential direction, a cage which is configured by engagingly integrating two annular members in the axial direction with each other is used for the sake of convenience in an assembling process. As such a cage which is configured by engagingly integrating two annular members with each other, for example, known is a cage which is disclosed in Japanese Patent Publication (Kokai) No. HEI9-166161.

The cage of the one-way clutch integrated with a rolling bearing which is disclosed in the publication is configured in the following manner. As shown in an exploded perspective view of FIG. 6, in two annular members 61 and 62, recesses 611 and 621 which, under state where the members are engaged with each other, configure pockets for housing rolling elements in the center portion are formed in one end side in the axial direction and at constant intervals in the circumferential direction. Pockets 612 and 622 for housing sprags are formed in the opposite end side. In one of the two annular members 61 and 62, or the annular member 61, a claw 613 which elongates in the axial direction is formed in several positions arranged along the circumferential direction. In the other annular member 62, plural recesses 623 with which the claws 613 are to be fittingly engaged are formed. In an assembling process, a required number of rolling elements are inserted and arranged between the inner and outer races and at substantially constant intervals in the circumferential direction. Thereafter, the annular members 61 and 62 are inserted between the inner and outer races so as to sandwich the rolling members from the both sides in the axial direction. The claws 613 are respectively inserted into the recesses 623 so as to be engaged therewith, whereby the annular members are integrated with each other.

As exemplarily shown in a section view of FIG. 7 taken in the axial direction under an engagement state, in each of the claws 613 and the recesses 623, an inclined face 613a or 623a is formed in the tip end side, and an engaging portion 613b or 623b is formed in the basal end of the inclined face 613a or 623a. According to this structure, in an assembling process, the annular members 61 and 62 can be easily engaged with each other by snap fit, and, after assembling, the engagement state is prevented by the engagement of the engaging portions 613b and 623b from being easily cancelled.

In such a one-way clutch integrated with a rolling bearing, when an impact load or the like is applied to the two annular members 61 and 62 constituting the case, the claws 613 are bent in an inner radial direction (toward the axial center of the clutch). This may cause the engaging portions 613b and 623b to be disengaged from each other to cancel the engagement state of the two members.

SUMMARY OF THE INVENTION

The invention has been conducted in view of the above-mentioned circumstances. It is an object of the invention to provide a one-way clutch integrated with a rolling bearing which has a structure of integrating two annular members with each other by snap fit, which comprises a cage that commonly holds plural rolling elements of the rolling bearing, and plural sprags of the one-way clutch, in which, even when an impact load or the like is applied, a simple configuration can prevent the engagement state of the two annular members from being cancelled, and which has therefore excellent impact resistance and the like.

In order to attain the object, the one-way clutch integrated with a rolling bearing of the invention is a one-way clutch integrated with a rolling bearing in which plural rolling elements and sprags are arranged in an annular space between an inner race and an outer race in each of which a raceway surface for a one-way clutch is formed in both sides of a raceway surface for a rolling bearing, the rolling elements and the sprags make contact with corresponding one of the raceway surfaces, the rolling elements and the sprags are held at constant intervals in a circumferential direction by a common cage which is configured by engagingly integrating two annular members with each other in an axial direction, and the sprags are urged by springs in a locking direction in respective pockets of the cage, wherein a claw which elongates in the axial direction is formed in plural positions arranged along a circumferential direction in one of the two annular members constituting the cage, recesses with which the claws are to be fittingly engaged are formed in another one of the annular members, and a rib which elongates in the axial direction is formed in each of the claws and the recesses, the ribs being adjacent to each other in an engagement state to prevent the claws from being bent in an inner radial direction.

In the invention, interference between the axial ribs disposed in the claw and the recess blocks bending of the claw in an inner radial direction, without requiring stiffening such as thickening of the claw, and improves the substantial rigidity of the claw in the direction, thereby attaining the desired object.

Specifically, a rib which elongates in the axial direction is formed in each of the claw and the recess which are to be fitted in the axial direction to be engaged with each other, the ribs formed in the claw and the recess are made adjacent each other under the engagement state of the claw and the recess, and, when the claw is to be bent in an inner radial direction by an impact or the like, the ribs of the claw and the recess interfere with each other. According to this configuration, when the claw is to be bent in an inner radial direction, i.e., toward the axial center by an impact or the like, the ribs of the claw and the recess interfere with each other, and hence bending of the claw is blocked, with the result that the engagement of the claw and the recess can be prevented from being cancelled by bending of the claw.

BRIEF DESCRIPTION OF THE DRAWINGS

FIG. 1 is a side view of an embodiment of the invention, partially cutting away one side plate 6a;

DETAILED DESCRIPTION OF THE PREFERRED EMBODIMENTS

Figure 1:
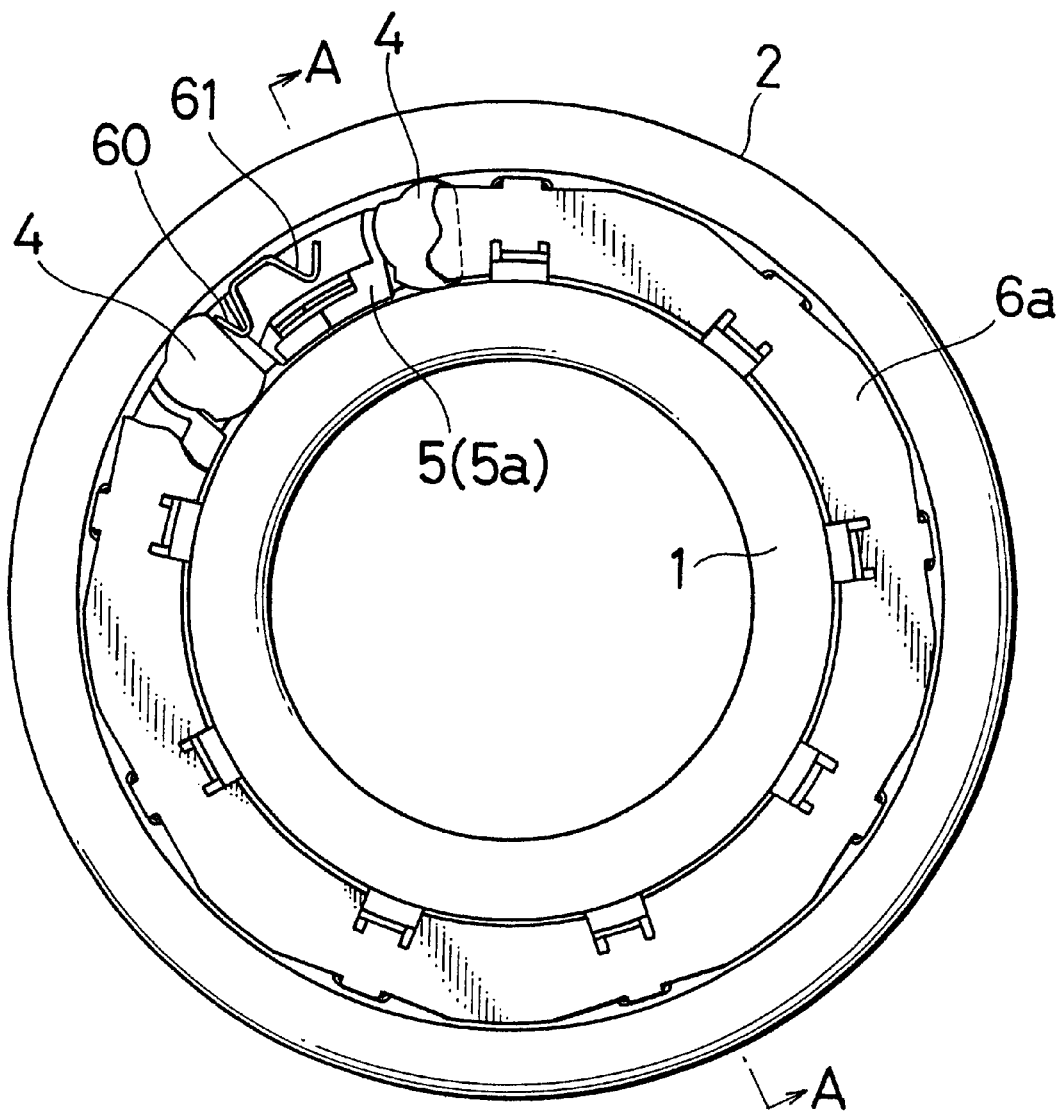
Figure 2:
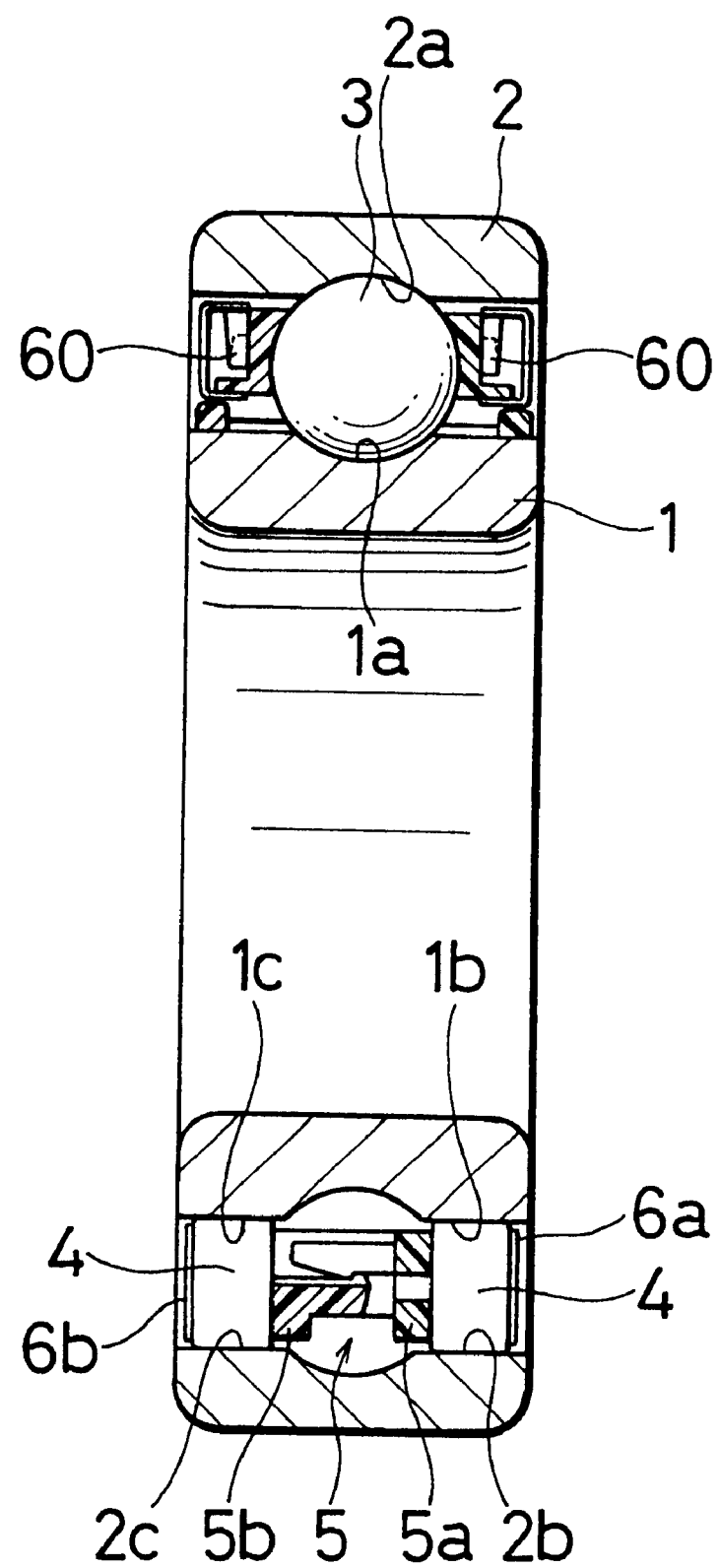
FIG. 2 is a section view taken along the line A—A of FIG. 1.

Hereinafter, an embodiment of the invention will be described with reference to the accompanying drawings. FIG. 1 is a side view of an embodiment of the invention, partially cutting away a side plate 6a, and FIG. 2 is a section view taken along the line A—A of FIG. 1.

A raceway surface 1a for a deep groove ball bearing is formed in an axial center portion of the outer peripheral face of an inner race 1, and raceway surfaces 1b and 1c for a one-way clutch are formed in both the sides of the raceway surface, respectively. Opposing to the raceway surfaces, a raceway surface 2a for a deep groove ball bearing, and raceway surfaces 2b and 2c for a one-way clutch on both the sides of the raceway surface 2a are formed on the inner peripheral face of an outer race 2. Plural balls 3 are arranged between the inner race 1 and the outer race 2 so as to make rolling contact with the raceway surfaces 1a and 2a for a deep groove ball bearing, and plural sprags 4 are arranged so as to tiltably make contact with raceway surfaces 1b and 2b, and 1c and 2c for a one-way clutch.

A cage 5 also is placed between the inner race 1 and the outer race 2. The balls 3 and the sprags 4 are respectively housed in pockets formed in the cage 5, to be held in the corresponding raceways and at constant intervals in the circumferential direction. The cage 5 is configured by engaging and integrating the first and second annular members 5a and 5b in the axial direction. Annular side plates 6a and 6b are fixed to outer end faces of the annular members 5a and 5b, respectively. Springs 60 which respectively enter the pockets for the sprags in the cage 5 to urge the sprags 4 toward the locking side are integrally formed in the side plates 6a and 6b. Springs 61 which are formed in trailing positions with respect to the springs 60 are used for positioning the side plates 6a and 6b during an assembling process, and do not function as elements of the one-way clutch.

Figure 3:
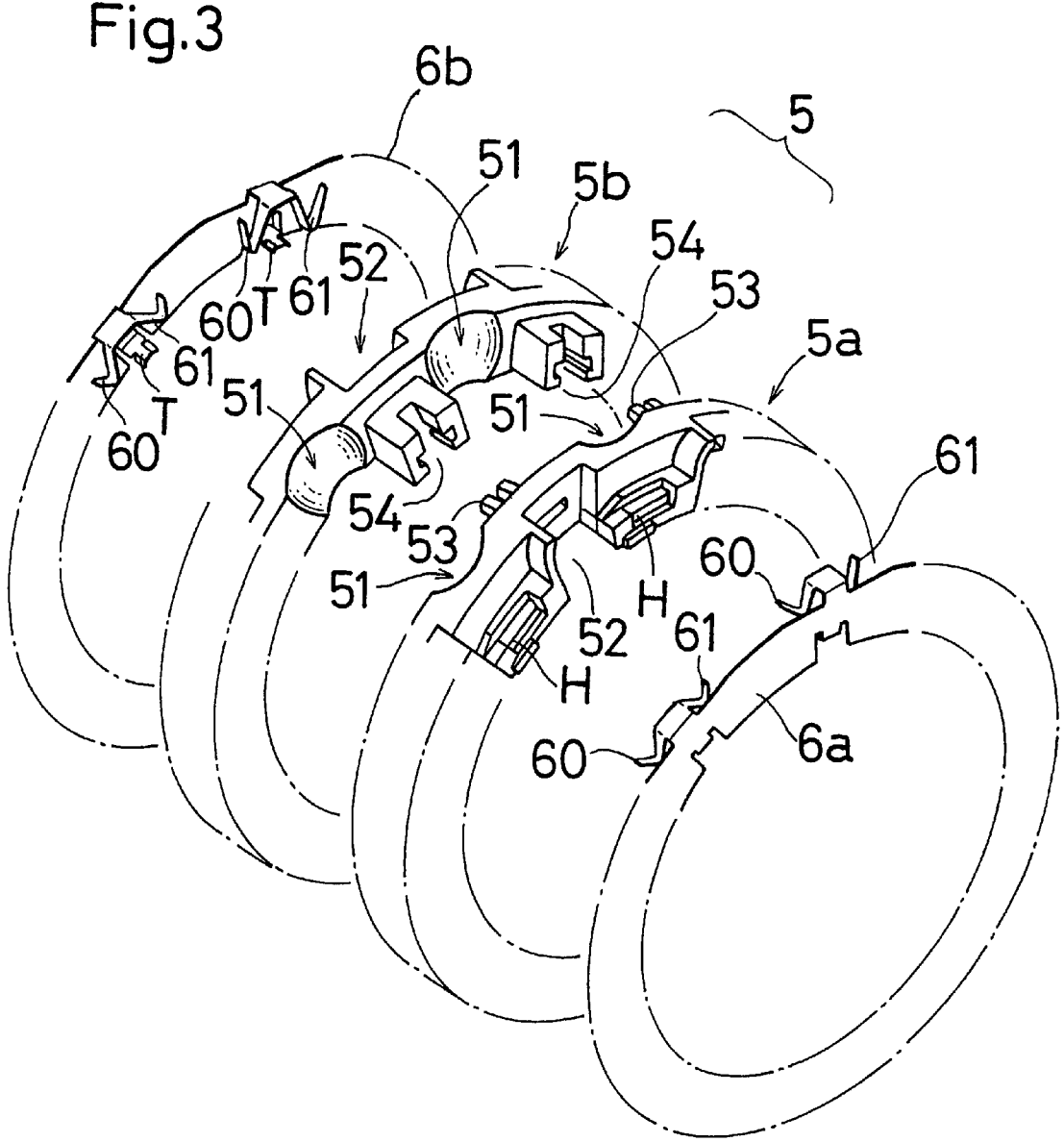
FIG. 3 is an exploded perspective view of a first annular member 5a and a second annular member 5b constituting a cage 5 of the embodiment of the invention, and side plates 6a and 6b on both the sides of the annular members.

FIG. 3 is an exploded perspective view of the cage 5 and the side plates 6a and 6b. In each of the first annular member 5a and the second annular member 5b which constitute the cage 5, ball pocket recesses 51 for housing the balls 3 are formed in one end side in the axial direction and at constant intervals in the circumferential direction. Under the state where the first annular member 5a and the second annular member 5b are engaged with each other, the corresponding pocket recesses 51 of the members are opposed to each other to form a part of a spherical surface. In the other end side of the first annular member 5a and the second annular member 5b, sprag pockets 52 for housing the sprags 4 are formed at constant intervals in the circumferential direction. Fixation of the side plates 6a and 6b to the annular members 5a and 5b is performed by fitting tongues T having a locking piece and integrally formed in places of the side plates 6a and 6b where the springs 60 and 61 are formed, into engaging holes H which are formed in the other end faces of the annular members 5a and 5b.

In one end side of the first annular member 5a constituting the cage 5, claws 53 which elongate in the axial direction are respectively formed between the pocket recesses 51, and, in one end side of the second annular member 5b, recesses 54 which elongate in the axial direction are respectively formed between the pocket recesses 51. The first annular member 5a and the second annular member 5b are engaged and integrated in the axial direction with each other by the plural claws 53 and the recesses 54 which are equal in number to the claws.

Figure 4:
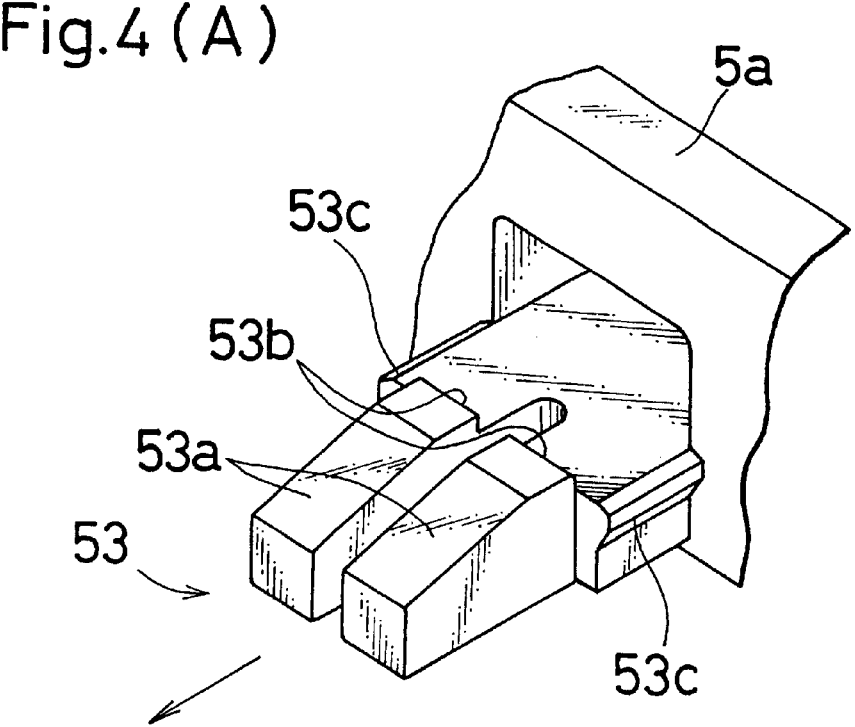
FIG. 4(A) is an external perspective view of the vicinity of a claw 53 which is formed in the first annular member 5a of the embodiment of the invention.
FIG. 4(B) is an external perspective view of the vicinity of a recess 54 which is formed in the second annular member 5b of the embodiment of the invention.
Figure 4:
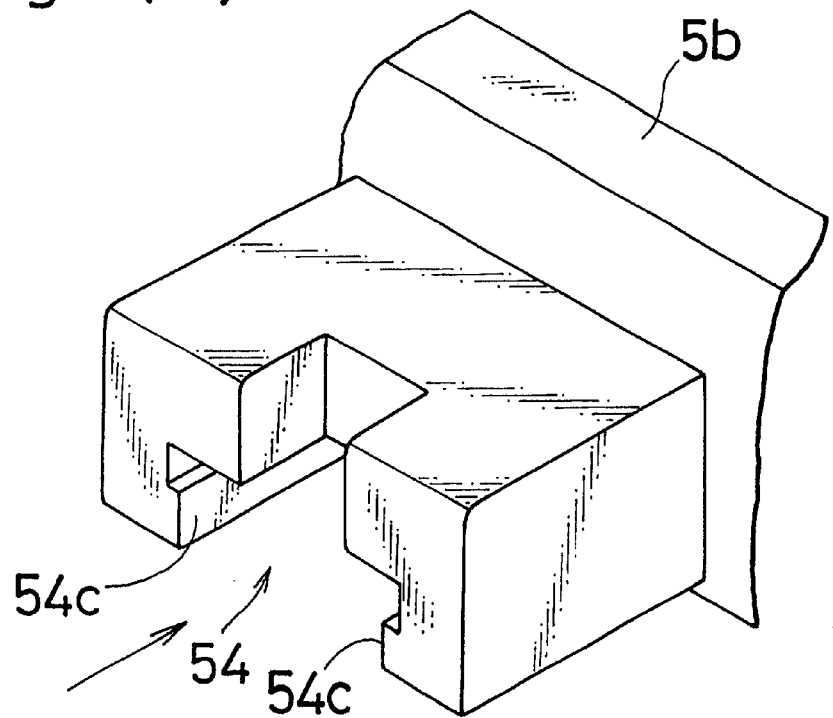
Figure 5:
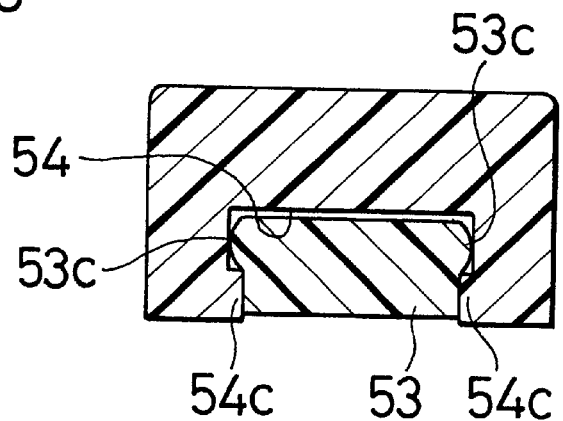
FIG. 5 is a section view perpendicular to an axis and showing an engagement state of the claw 53 of the first annular member 5a and the recess 54 of the second annular member 5b in the embodiment of the invention.
Figure 6:
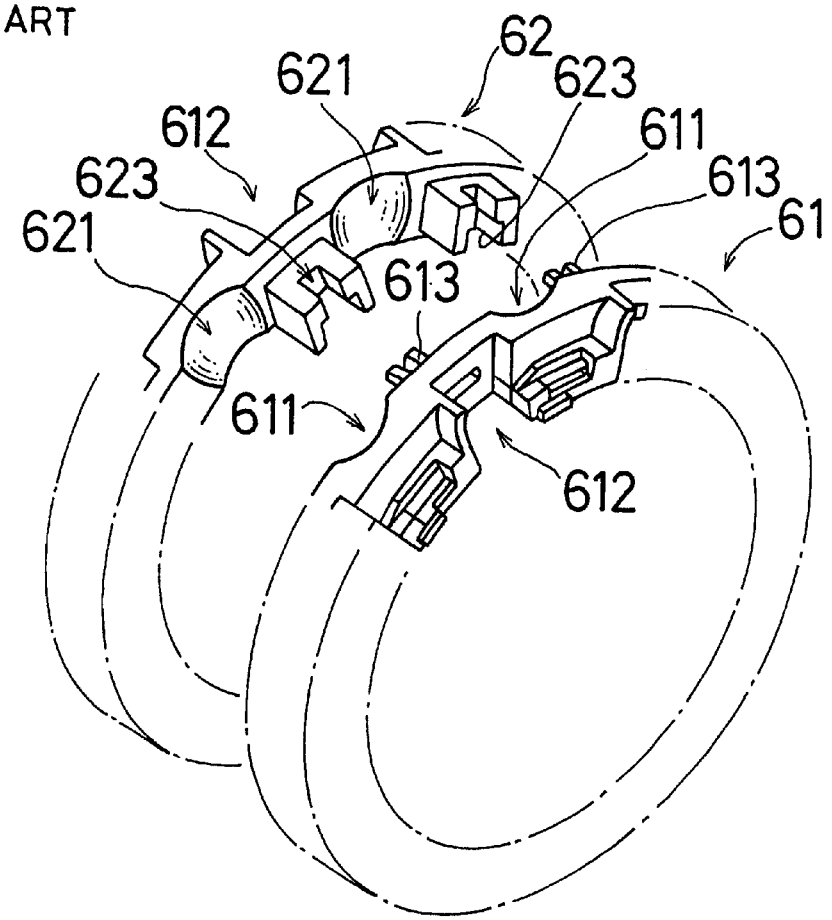
FIG. 6 is an exploded perspective view showing a configuration example of a cage of a one-way clutch integrated with a rolling bearing of the prior art.
Figure 7:
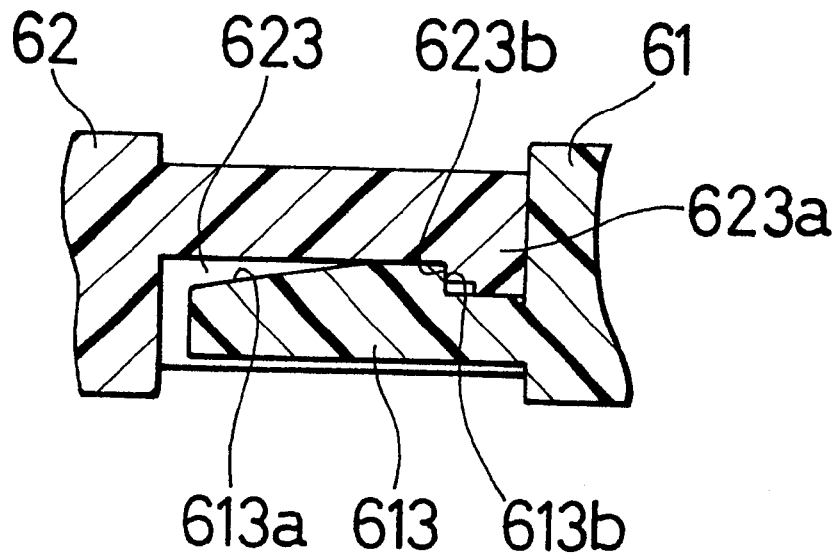
FIG. 7 is a section view parallel to an axis and showing an engagement state of a claw and a recess of first and second annular member 61 and 62 in the cage of FIG. 6.

FIG. 4(A) is a perspective view of one of the claws 53 which are formed in the first annular member 5a, and FIG. 4(B) is a perspective view of one of the recesses 54 which are formed in the second annular member 5b. In the same manner as the prior art example shown in FIG. 7, in each of the claws 53 which are formed in plural positions arranged along a circumferential direction in one end side of the first annular member 5a, an inclined face 53a which is directed so that the thickness is further reduced as more reaching the tip end is formed in the tip end side, and an engaging portion 53b is formed in the basal end of the inclined face 53a. By contrast, in each of the recesses 54 formed in the second annular member 5b, although not shown in FIG. 5, an inclined face and an engaging portion which are equivalent to the inclined face 623a and the engaging portion 623b that are exemplarily shown in FIG. 7 are formed in the inner face side. Under a state where the recess is engaged with the claw 53, the engaging portion is engaged with the engaging portion 53b of the claw 53, whereby, even when a force in the axial direction is applied, the engagement is prevented from being easily cancelled.

A rib 53c which elongates in the direction of insertion into the recess 54, i.e., the axial direction is formed on each of the side faces of the basal end portion of the claw 53. In accordance with this formation, ribs 54c which elongate from the tip end portion by at least a predetermined length in the axial direction are formed also in the recess 54. As shown in a section view of FIG. 5 perpendicular to the axis and showing the engagement state, the ribs 53c and 54c are formed in positions which are adjacent to each other in a radial direction under a state where the claw and the recess are engaged with each other.

In the above-described embodiment of the invention, the cage 5 is assembled in the following manner. In the same manner as the prior art, under a state where a required number of balls 3 are arranged between the ball bearing raceway surfaces 1a and 2a of the inner race 1 and the outer race 2 and at substantially constant intervals in the circumferential direction, the first annular member 5a and the second annular member 5b are inserted between the inner race 1 and the outer race 2 from the both axial sides, and the claws 53 are respectively inserted into the recesses 54 to be engagingly integrated with each other by snap fit, thereby configuring the cage 5. Under the state where the first and second annular members 5a and 5b are engaged with each other, the ribs 53c and 54c of the claws 53 and the recesses 54 which elongate in the axial direction are adjacent to each other in a radial direction. Even when an impact load or the like is applied to the cage 5 and the claws are to be bent in an inner radial direction, i.e., toward the axial center, therefore, the bending is blocked because the ribs 53c and 54c interfere with each other. Consequently, the state where the engaging portions 53b of the claws 53 are always engaged with the engaging portions of the recesses 54 is maintained, so that the first annular member 5a is not separated from the second annular member 5b.

As described above, according to the invention, in a one-way clutch integrated with a rolling bearing in which first and second annular members are engagingly integrated with each other in the axial direction, and which comprises a cage that commonly holds plural rolling elements of the rolling bearing, and plural sprags of the one-way clutch, a rib which elongates in the axial direction is formed in each of plural claws and recesses which are formed in the first and second annular members to engagingly integrate the members, the ribs being adjacent to each other in an inner radial direction in an engagement state. Under a state where the first and second annular members are once engagingly integrated with each other by snap fit, even when the claws are to be bent in an inner radial direction by an impact load or the like applied to the cage, therefore, the ribs of the claws and the recesses interfere with each other to block the bending. Consequently, the engagement state of the claws and the recesses is maintained, and, unlike the prior art, the cage is prevented from being disassembled by an impact load. As a result, a one-way clutch integrated with a rolling bearing which has excellent impact resistance can be obtained.

What is claimed is:

1. A one-way clutch integrated with a rolling bearing in which plural rolling elements and sprags are arranged in an annular space between an inner race and an outer race in each of which a raceway surface for a one-way clutch is formed in both sides of a raceway surface for a rolling bearing, said rolling elements and said sprags make contact with corresponding one of said raceway surfaces, said rolling elements and said sprags are held at constant intervals in a circumferential direction by a common cage which is configured by engagingly integrating two annular members with each other in an axial direction, and said sprags are urged by springs in a locking direction in respective pockets of said cage, wherein a claw which elongates in the axial direction is formed in plural positions arranged along a circumferential direction in one of said two annular members constituting said cage, recesses with which said claws are to be fittingly engaged are formed in another one of said annular members, and a rib which elongates in the axial direction is formed in each of said claws and said recesses, said ribs being adjacent to each other in an engagement state to prevent said claws from being bent in an inner radial direction.

2. A one-way clutch integrated with a rolling bearing according to claim 1, wherein said ribs of said claws and said recesses are formed on side faces of said claws and said recesses, respectively.

3. A one-way clutch integrated with a rolling bearing according to claim 2, wherein said ribs of said claws are formed in basal end portions of said claws, respectively.

* * * * *